No. 746,265. PATENTED DEC. 8, 1903.
W. T. BARKER.
FURNACE FEEDER.
APPLICATION FILED SEPT. 10, 1902.
NO MODEL. 2 SHEETS—SHEET 1.
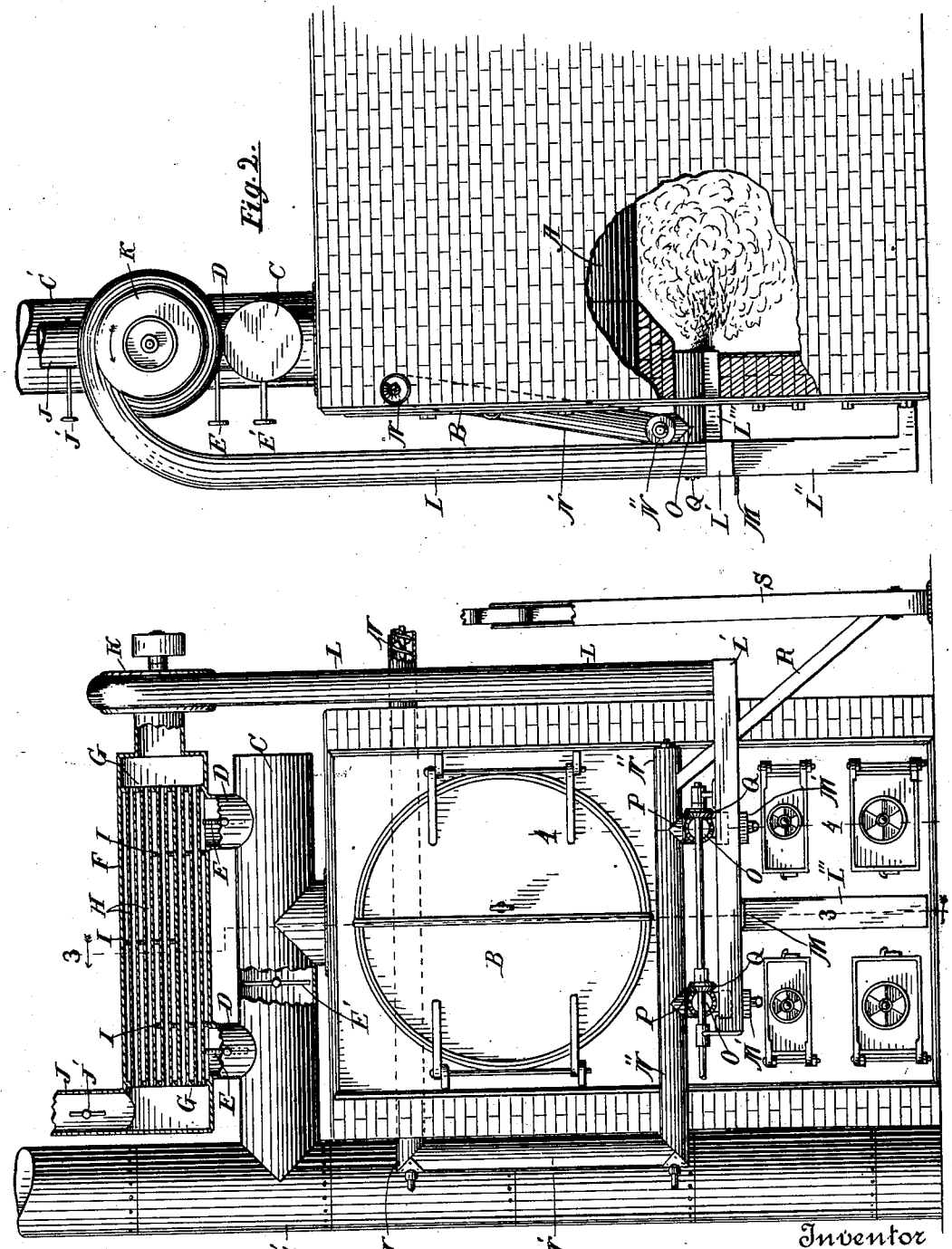
Witnesses
Palmer A. Jones.
Georgiana Chase
Inventor
Wells T. Barker
By Luther V. Moulton
Attorney No. 746,265. PATENTED DEC. 8, 1903.
W. T. BARKER.
FURNACE FEEDER.
APPLICATION FILED SEPT. 10, 1902.
NO MODEL. 2 SHEETS—SHEET 2.
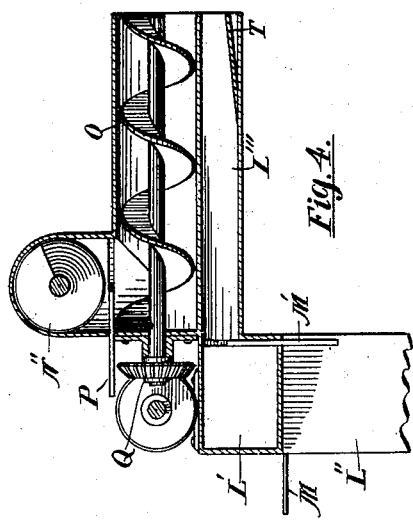
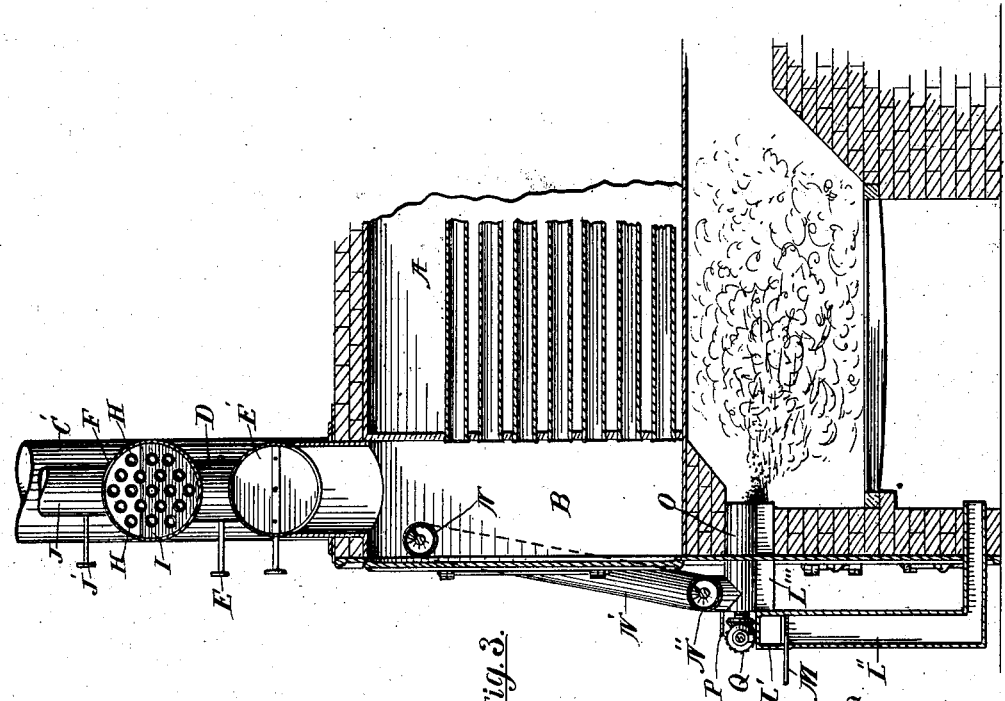
Inventor
Wells T. Barker
By Luther V. Moulton
Attorney
Witnesses
Palmer A. Jones
Georgiana Chase No. 746,265. Patented December 8, 1903.

UNITED STATES PATENT OFFICE.

WELLS T. BARKER, OF GRAND RAPIDS, MICHIGAN.

FURNACE-FEEDER.

SPECIFICATION forming part of Letters Patent No. 746,265, dated December 8, 1903.

Application filed September 10, 1902. Serial No. 122,831. (No model.)

*To all whom it may concern:*

Be it known that I, WELLS T. BARKER, a citizen of the United States, residing at Grand Rapids, in the county of Kent and State of Michigan, have invented certain new and useful Improvements in Furnace-Feeders; and I do hereby declare the following to be a full, clear, and exact description of the invention, such as will enable others skilled in the art to which it appertains to make and use the same.

My invention relates to improvements in furnace-feeders, and more particularly to furnace-feeders for steam-boilers; and its object is to provide means whereby the air and fuel will be kept separate until mixed in the furnace, and thus both may be highly heated without premature combustion and the air and fuel fed into the furnace automatically in regulated quantities and in the best possible condition to produce complete combustion and the highest efficiency.

My invention consists in means for automatically exposing pulverized or comminuted fuel in a constant stream to the heat of the gases escaping from the furnace, whereby the said fuel is preliminarily heated and partially made into vapor, and then spraying the fuel into the furnace by means of the hot-air blast, together with means for heating the air supplied to the furnace, and then forcing the same into the furnace in regulated quantities and in such relation to the incoming fuel as will blend the two streams of fuel and air and effectually mix the same within the furnace, whereby the air and fuel may be heated above combustion temperature and kept separate until intimately mixed and ignited within the furnace, and thus combustion effected with completeness and efficiency, as will more fully appear by reference to the accompanying drawings, in which is shown one form of my invention.

Figure 1 is a front elevation with parts broken away to show the construction. Fig. 2 is a side elevation of the same with a portion of the arch broken away. Fig. 3 is a vertical section on the line 3 3, Fig. 1; and Fig. 4 is an enlarged detail of the air and fuel feeding mechanism adjacent to the furnace and shown in vertical section on the line 4 4, Fig. 1.

Like letters refer to like parts in all of the figures.

A represents an ordinary flue-boiler heated by the usual furnace and connected to a chimney C' by suitable smoke-passages to convey away the products of combustion after they have heated the boiler. These passages may be of any convenient construction to coöperate with the air and fuel heating means, whereby the waste heat of the furnace is used to heat the air and fuel. In the device shown the smoke-passages consist of the smoke box or breeching B and an uptake C, connected thereto and to the chimney. Connected to this uptake by pipes D, provided with dampers E, is an air-heater F, consisting of a suitable cylinder having flue-sheets G near each end, between which extend flues H to heat the air, and at intervals in the spaces through which these flues extend is arranged diaphragms I, whereby the heated gases from the furnace are caused to traverse in serpentine direction in passing through this heater. Connected to one end of the air-heater is a suitable intake-pipe J, provided with a damper J', and connected to the other end of the heater is a fan K to force the heated air into the furnace. Connected to this fan is a suitable pipe L, extending downward from the fan to a suitable trunk-pipe L', extending across the front of the furnace just below the fuel-feeders and provided with branch pipes L''', extending horizontally into the furnace, and another pipe L'', extending downward to the ash-pit to supply air beneath the grates. To regulate the flow of air through these pipes and into the furnace, gates or slides M and M' are provided, as shown. To direct the air-current upward and into the fuel, an inclined throat T is provided in the pipe L''', as shown in Fig. 4. To heat the fuel and feed the same into the furnace, the fuel after being suitably pulverized by any convenient means is supplied to a conveyer N, which conveyer extends through the smoke-box and thence is connected by a pipe N', extending down to another conveyer N'', extending horizontally across the front of the furnace. Beneath this latter conveyer is arranged suitable transverse conveyers O and opening into the furnace directly over the air-pipes L'''. These transverse conveyers are connected to the conveyer N'' by short vertical pipes provided with gates or slides P to regulate the flow of fuel into the furnace. These conveyers are operated by any suitable gearing Q, and any excess of fuel is allowed to escape by way of the spout R at the end of the conveyer N''', from whence it is conveyed back to the conveyer N by an elevator S.

From the foregoing the operation of my device will be readily understood. The pulverized coal or other suitable fuel is supplied from any suitable source to the conveyer N and in passing through the smoke-box becomes considerably heated, and the resultant gases therefrom are drawn into the furnace through the various conveyers and serve to assist in maintaining combustion therein. The remaining solid portion of the fuel becomes highly heated and passes to the furnace in this heated condition and being shut off from the air will not burn until mingled with the blast of hot-air entering the furnace through the pipe N'''', whereby it is readily and completely consumed. This air-blast also serves to scatter the fuel throughout the furnace, and thus distribute the flame. The air entering at the pipe J passes through the flues H, in which it is heated, and thence by way of the pipe L and trunk L' to the furnace, being delivered thereto by the pipes L'' and L''' and regulated by the gates M and M'. Any surplus fuel escapes through the trough R into the elevator S, and is thence carried back to and deposited in the conveyer N.

By more or less closing or opening of the dampers E and E' the amount of gases from the furnace passing through the heater can be regulated at pleasure, or the heater may be shut off entirely and the gases allowed to escape directly to the chimney. By the construction of the heater shown a very effective means of heating the incoming air is obtained, and by arranging the means for heating the fuel and air as shown I am able to use the waste heat escaping from the furnace after it has acted upon the boiler, and thus economize the heat that would otherwise escape up the chimney.

By heating both the incoming fuel and air separately to a high temperature combustion will not take place until the same are mixed in the furnace. I can thus carry the heat much higher than would be the case if they were mixed earlier in the operation.

Having thus fully described my invention, what I claim, and desire to secure by Letters Patent, is—

1. In combination with a furnace, a boiler, a chimney, and a smoke-passage connecting the boiler and chimney, an air-heater connected to said passages and heated by the waste products of combustion, means for conveying air through said heater and to the furnace, a separate fuel-heater in the smoke-passage, and means for separately conveying the fuel through said heater and to the furnace.

2. The combination of a furnace having a smoke-box and an uptake, an air-heater connected to the uptake, pipes extending from the air-heater to the furnace, means for passing air through the heater and pipes and into the furnace, a closed fuel-conveyer extending through the smoke-box, means for discharging the heated fuel into the furnace, and means for mingling the air and fuel within the furnace.

3. The combination of a furnace having a smoke-box and uptake, an air-heater connected to the uptake, a fan connected to the air-heater, pipes extending from the fan to the furnace and opening into the same, gates to regulate the flow of air, a closed fuel-conveyer extending through the smoke-box, a conveyer extending across the front of the furnace and connected to the first-named conveyer, means for discharging the fuel into the furnace close above the air-inlets, and means for regulating the flow of fuel into the furnace.

4. In a furnace-feeder, in combination with a separate fuel-heater and a separate air-heater, a conveyer extending across the front of the furnace and connected to the fuel-heater, means for discharging the fuel into the furnace, an overflow to said conveyer, a conveyer to return the surplus fuel to the heater, an air-pipe connected to the air-heater, a branch-pipe extending from the air-pipe and opening into the furnace close below the fuel-inlet, and a gate to regulate the flow of air into the furnace.

5. The combination of a furnace having a smoke-box and an uptake, an air-heater connected to the uptake by pipes having dampers, a damper in the uptake, a fan connected to the air-heater, pipes extending from the fan to the furnace, gates in the pipes to regulate the flow of air, a closed fuel-conveyer extending through the smoke-box, conveyers connected to the said conveyer and opening into the furnace above the air-pipes, an overflow for the surplus fuel, a conveyer to return the same to the first-named conveyer, and gates to regulate the flow of fuel into the furnace.

6. The combination of a furnace, a chimney, a smoke-box, an uptake connecting the smoke-box and chimney, a damper in the uptake, an air-heater, pipes connecting the air-heater to the uptake, at each side of the damper, a fan to force air through the heater, pipes to convey the heated air, branch pipes opening into the furnace, gates to regulate the flow of the air, a closed fuel-conveyer extending through the smoke-box, and thence across the front of the furnace, gates to permit the fuel to escape from the conveyer, and transverse conveyers to discharge the fuel into the furnace above the branch air-pipes.

In testimony whereof I affix my signature in presence of two witnesses.

WELLS T. BARKER.

Witnesses:
LUTHER V. MOULTON,
PALMER A. JONES.